(12) United States Patent
Shi

(10) Patent No.: US 8,229,524 B2
(45) Date of Patent: Jul. 24, 2012

(54) CLIP SHAPED ELECTRONIC DEVICE WITH SWIVELLING PANELS

(75) Inventor: Xiao Xi Shi, GuangDong (CN)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 12/147,673

(22) Filed: Jun. 27, 2008

(65) Prior Publication Data

US 2009/0325654 A1    Dec. 31, 2009

(51) Int. Cl.
*H04M 1/00* (2006.01)
(52) U.S. Cl. .................................. 455/575.3; 455/575.4
(58) Field of Classification Search .................... 455/73, 455/550.1, 575.1, 575.3, 575.2, 575.4
See application file for complete search history.

(56) References Cited

U.S. PATENT DOCUMENTS

| | | | | |
|---|---|---|---|---|
| 6,249,684 B1 * | 6/2001 | Hasegawa | ................... | 455/575.3 |
| 6,285,756 B1 * | 9/2001 | Fan | ................ | 379/430 |
| 7,076,272 B2 * | 7/2006 | Ikeda et al. | ................. | 455/556.1 |
| 7,194,289 B1 * | 3/2007 | Flores, Jr. | ................... | 455/575.1 |
| 7,682,170 B2 * | 3/2010 | Hori et al. | ...................... | 439/164 |
| 2004/0180706 A1 * | 9/2004 | Pan | ............................ | 455/575.3 |
| 2006/0094482 A1 * | 5/2006 | Takagi | ........................ | 455/575.3 |
| 2007/0298850 A1 * | 12/2007 | Miyata et al. | .............. | 455/575.3 |
| 2009/0069060 A1 * | 3/2009 | Kim | ............................ | 455/575.6 |

* cited by examiner

*Primary Examiner* — Jean Gelin
(74) *Attorney, Agent, or Firm* — Harrington & Smith

(57) ABSTRACT

A mobile electronic device two panels arranged to swivel so that the panels can swivel between a retracted position in which the two panels substantially overlap one another and an extended position in which only a minor portion of the panels overlap one another. The panels are shaped and dimensioned to define a space between them when the panels are in the retracted position. The space is suitable for receiving and clamping an item such as garment or clothing between the panels when the panels are in the retracted position, so that the device can be clamped onto a belt or other piece of garment or clothing such as a pant pocket.

14 Claims, 4 Drawing Sheets

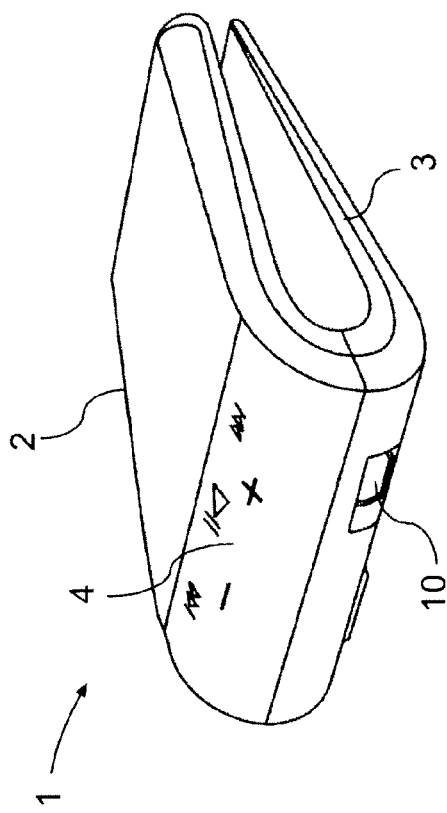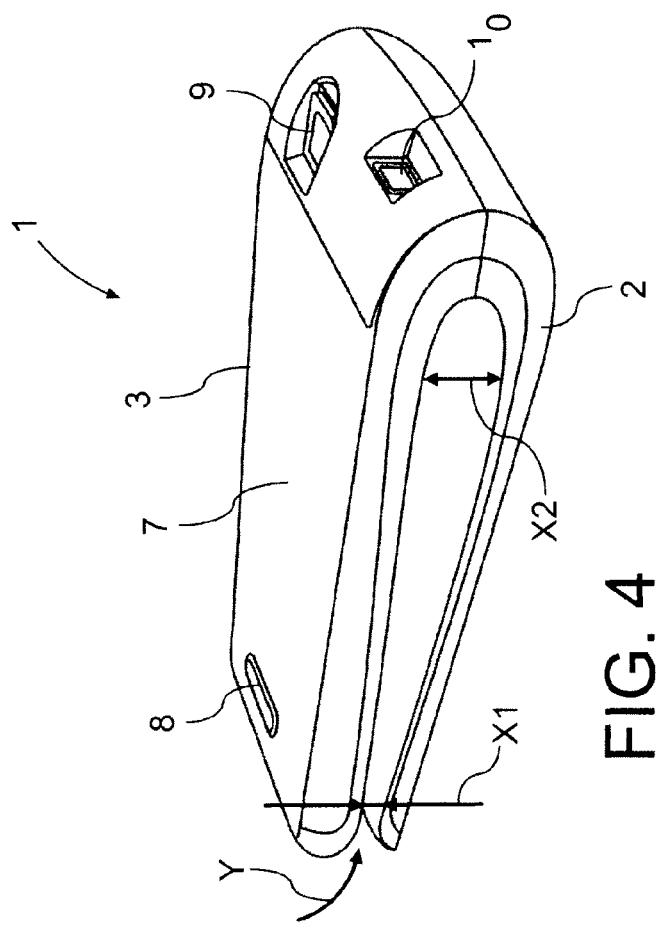

CLIP SHAPED ELECTRONIC DEVICE WITH SWIVELLING PANELS

The present application relates to a mobile electronic devices that include a housing having at least two panels that are movable relative to one another, in particular to mobile electronic devices that have at least two housing parts that can swivel relative to one another.

BACKGROUND

Mobile electronic devices with two panels that can be moved between a retracted position in which a keypad is concealed and an extended position in which the keypad is not concealed that use a sliding or swiveling movement are known in the art. In these known devices the mechanical function of the sliding or swiveling movement is usually restricted to the aspect of covering and uncovering a keypad and/or display or other user interface elements.

DISCLOSURE

On this background, the aspects of the disclosed embodiments provide a housing with two panels arranged to swivel about a swivel axis so that the panels can swivel between a retracted position in which at least a major portion of the two panels overlap one another and an extended position in which only a minor portion of the panels overlap one another, the panels being shaped and dimensioned to define a space between them when the panels are in the retracted position, the space being suitable for receiving and clamping an item such as garment or clothing between the panels when the panels are in the retracted position.

By providing a narrow space between the panels with the shape and dimensions suitable for receiving and clamping an item such as a piece of garment or clothing the device can be clipped onto a belt, a shirt, trousers and the like when the device is not in the hands of the user, i.e. the device itself is turned into a belt clip. This facilitates transport of the device since it can be "worn" comfortably and does not need to be put in a bag or pant pocket. The use of this type of device is facilitated and rendered more comfortable. Thus, an additional function for the relative movement between the panels is provided in the form of the device being able to assume the position in which it is shaped like a clip and can be clipped on to a piece of closing or garment.

The space between the panels can be narrow near the extremity of the panels opposite to the swivel axis and widens in the direction towards the swivel axis.

One of the panels may be provided with a protrusion near or at the narrow area of the space between the panels. The protrusion increases the clamping effect to ensure that the device will not release itself from the piece of cloth or garment that it had been a clipped onto.

Preferably, there is substantially no space between the panels in the area near the swivel axis.

The swivel axis may located near one of the extremities of the panels.

The extremities of the panels opposite to the swivel axis may be shaped so that they form a substantially V-shaped recess that facilitates easy entry of a piece of cloth or other fabric material to enter the narrow space between the panels.

The extremities of the panels near the swivel axis are shaped so as to form a single substantially smooth convex surface when the panels are in the retracted position. Thus, the device will in the retracted position have a U-shaped or C-shaped housing with a rounded off top that is comfortable to grip for clipping it on to a belt or the like.

The panels may be shaped and dimensioned to assume an S-shaped configuration with a substantially smooth contour in the extended position.

One of the surfaces the panels may be provided with a keypad. One of the other surfaces of the panels may be provided with a reduced keypad.

One of the surfaces of the panels may be provided with a display.

One of the services of the panels may be provided with a mirror.

The device may be provided with a music or media player.

The device may be provided with a mobile phone.

The device may be provided with a digital still and/or motion camera.

The device may be provided with a navigation unit.

In another aspect, the disclosed embodiments provide a mobile electronic device with a housing two panels than can swivel relative to one another between a retracted position in which the panels substantially overlie one another and an extended position in which only a minor portion of the panels overlie one another, wherein the panels are shaped and dimensioned so as to form a clip when the panels are in the retracted position.

Further objects, features, advantages and properties of the mobile electronic device according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIGS. 4 and 5 are elevated views of the device shown in FIGS. 1 to 3 in a retracted position.

DETAILED DESCRIPTION OF PREFERRED EMBODIMENTS

In the following detailed description, the mobile electronic device according to the teachings for this application will be described by the embodiments.

Figure 3:
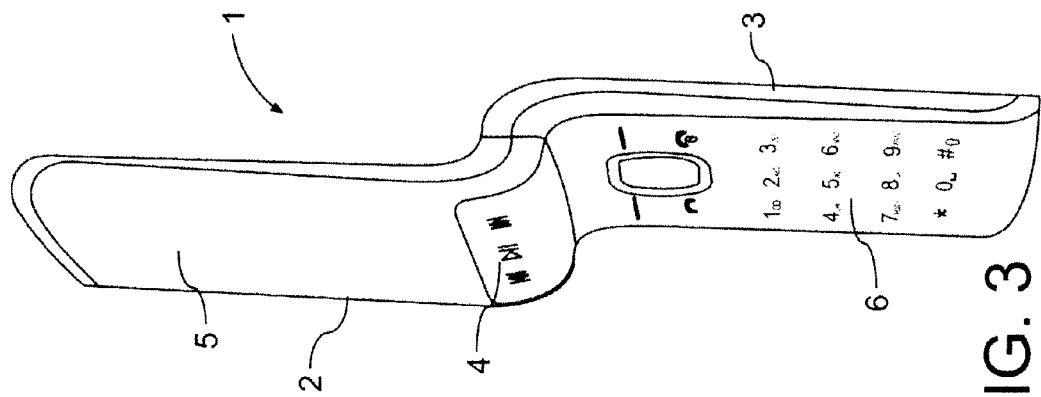
FIGS. 1 to 3 are a series of elevated views illustrating various positions of the device according to an embodiment.
Figure 2:
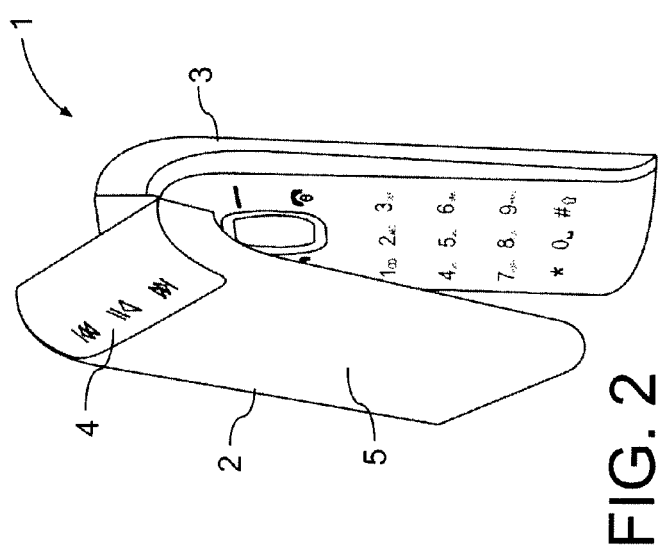
Figure 1:
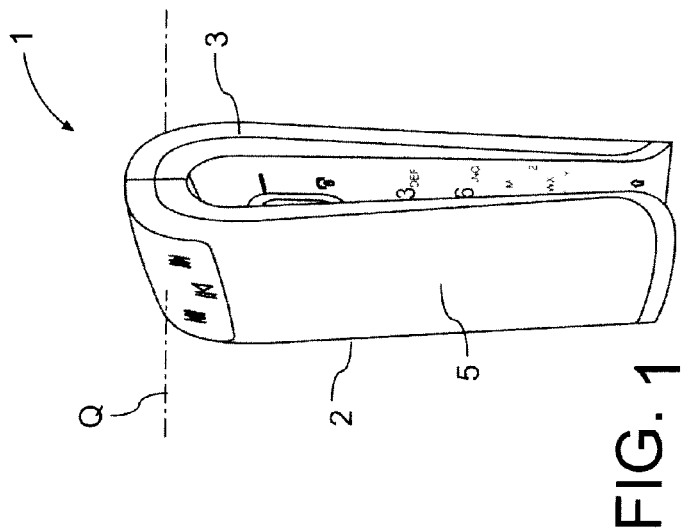

FIGS. 1 to 3 illustrate an embodiment of a device in the form of a mobile telephone 1 by a series of elevated views. In FIG. 1 in the device 1 is in a retracted position with the two panels 2,3 of the device in a retracted position. In FIG. 2 in the panels 2,3 have been rotated/swiveled relative to one another and are now in an intermediate position. In FIG. 3 the panels 2,3 have been swiveled further and have assumed an extended position.

The device 1 is provided with a user interface having a panel 2 and a panel 3, a reduced keypad 4, a display screen 5, and a keypad 6. The user interface includes further elements, such as a speaker and a microphone but they are not shown in the figures.

The phone 1 according to the present embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

Non-vocal user input is mainly via the display screen 5, a reduced keypad 4 and a keypad 6.

Panel 2 and panel 3 are connected to one another at swivel axis Q, about which the panels can rotated relative to one another between the retracted position of FIG. 1 via a range of intermediate positions of which one is shown in FIG. 2 to an extended position shown in FIG. 3. The swivel mechanism is not shown and can be of any known type suitable for swivel type mobile electronic device.

In the retracted position shown in FIG. 1 the keypad is covered and a major portion of the panels 2 and 3 overlie one another. The overlap of the panels 2 and 3 can be complete or alternatively at least a major portion of the panels 2 and 3 overlap.

In the retracted position the housing of the device 1 has a shape that renders it suitable to be clipped on to a piece of garment or cloth, such as a belt, trousers, a tank top, etc. Thus, the housing of the device 1 forms itself a clip and can be used like a belt clip.

Preferably, the keypad 6 is deactivated or locked when the device 1 is in the retracted position so that the pressure from any material that is placed between the panels 2,3 when the device 1 is clipped onto some item this pressure does not cause inadvertent keystrokes on the keypad 6. In the retracted position the user can use the reduced keypad 4 for operation of the device 1. In the present embodiment the reduced keypad 4 is provided with keys for operating a media player that is included in the device 1. However, the keys of the reduced keypad 4 could have any other desired function, such as keys for operating a digital still and/or motion camera, a navigation device, etc. that is included in the device 1. Due to the shape of the panels 2,3 the reduced keypad 4 can be used in both the extended position and the retracted position.

In the extended position shown in FIG. 3 the panels 2 and 3 only overlie one another in a minor area near the swivel axis Q and the device 1 is ready for use since the keypad 6 is now accessible and active. The display 5 is visible in any position of the device 1.

The extremities of the panels 2 and 3 at the swivel axis Q are rounded off and form a single substantially smooth convex top surface for the device when it is in the retracted position and form a smooth S-shaped housing when the device 1 is in the extended position. In both positions this provides for a smooth surface that renders touch contact with the device more pleasant and comfortable for a user. In particular when the user needs to grasp the device with clipped onto the top of trousers or a belt the round top of the device 1 makes it easier to get the user's fingers between the device and clothing or the skin of the user.

FIGS. 4 and 5 show the device in the retracted position. Panel 3 is provided at its rounded off top with a camera lens 9 and a USB port 10. The rear side of panel 3 is provided with a releasable cover 7 that can be removed by the user after pressing on the release button 8, e.g. for changing a battery (not shown) that is placed inside panel 3. The rounded off top of panel 2 is provided with the reduced keypad 4.

FIG. 4 also illustrates the space between the panels 2,3 that is used for receiving the piece of cloth or garment when the device 1 is clipped on to an item of cloth or garment or the like. The space between the panels 2,3 is relatively narrow near the extremities of the panels that are far away from the swivel axis. The distance between the panels 2,3 at the narrowest area of the space between the panels 2,3 is indicated by arrow X1. The space between the panels 2,3 gradually increases from the narrowest part in the direction towards the swivel axis Q until it reaches a maximum at the position indicated by arrow X2 and becomes substantially zero in the area near the swivel axis Q.

In order to facilitate entry of a piece of cloth or garment between the panels 2, 3, the extremities of the panels 2,3 opposite to the swivel axis are shaped to create a V-shaped entry for the piece of cloth or garment. The V-shaped entry is indicated in FIG. 4 by arrow Y.

Figure 7:
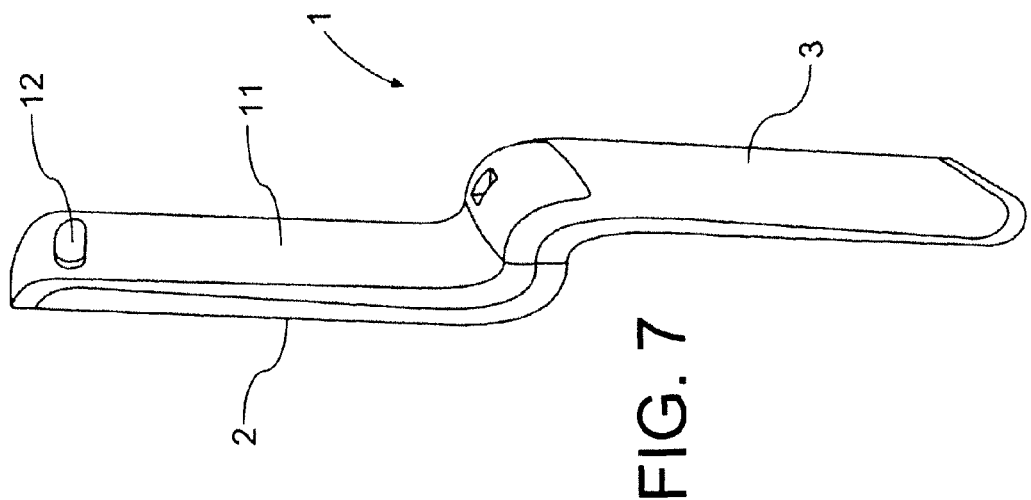
FIGS. 6 and 7 are elevated views of the device shown in FIGS. 1 to 3 in an extended position.
Figure 6:
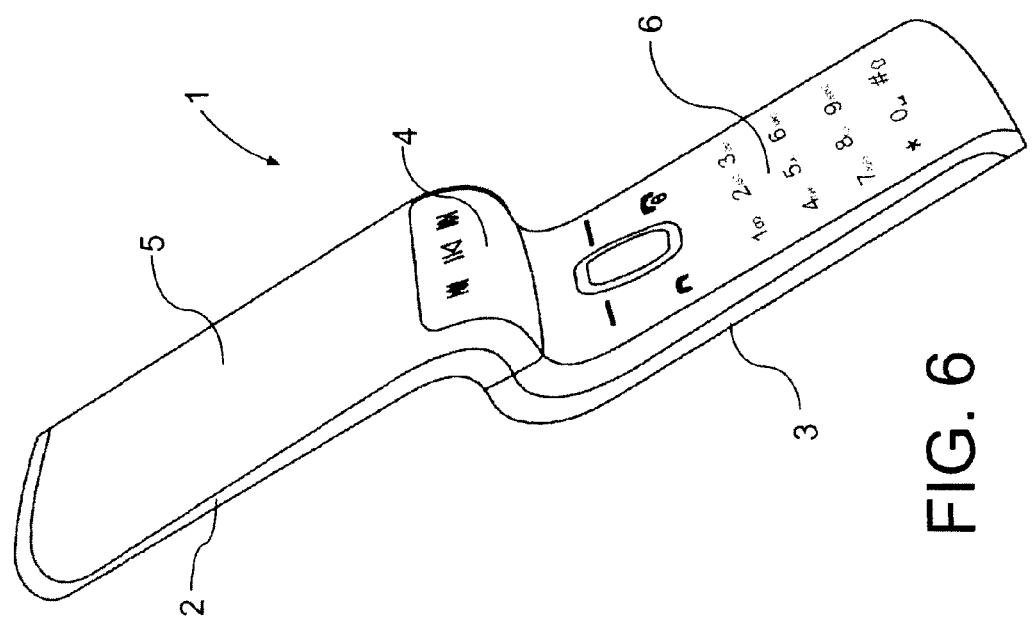

FIGS. 6 and 7 show the device 1 in the extended position. Panel 2 is provided with a protrusion 12 and a mirror surface 11 on its inner side. The protrusion 12 is located in the area where the space between the panels 2,3 is minimal in order to enforce the clamping effect of the device 1 on a piece of garment. Typically, this means that the protrusion 12 is located near the end of panel 2 opposite to the swivel axis Q.

The rigidity and elasticity of the panels and of the swivel construction is such that the extremities of the panels 2,3 opposite to the swivel axis Q can move resiliently away towards and from one another to further improve the clamping effect of the device 1 when it is in its retracted position.

Figure 9:
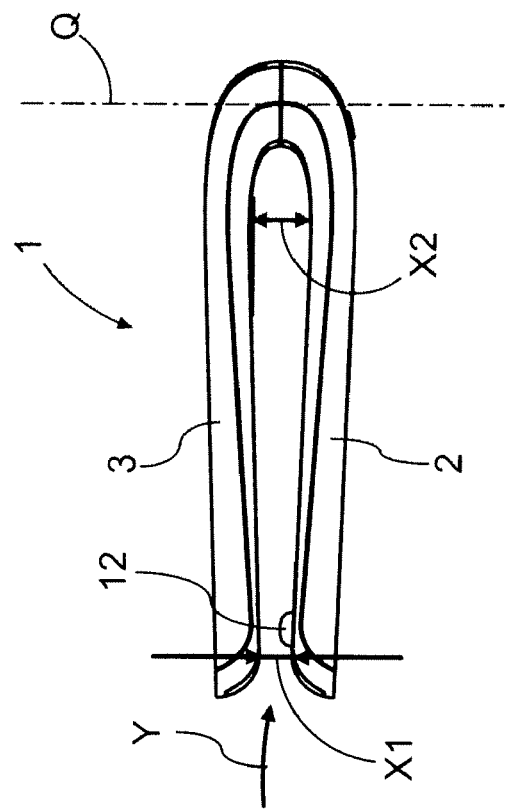
FIG. 9 is a side view of the device shown in FIGS. 1 to 3.
Figure 8:
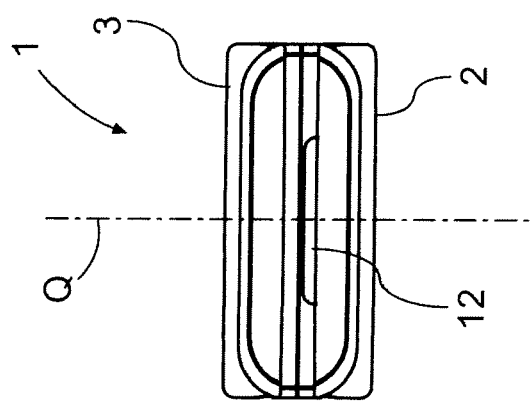
FIG. 8 is a top view on the device shown in FIGS. 1 to 3 in a retracted position.

FIGS. 8 and 9 further illustrate the protrusion 12, which can have an elongated shape as can be seen in FIG. 8, and the space between the panels is illustrated in FIG. 9.

In the device 1 can be clipped onto clothes or onto a piece of garment with either panel 2,3 being on the "outside" and the other panel being located in the "inside" between the item that the device is clipped onto and the body of the user. With panel 2 on the outside, a "neutral" side of the device is visible to any bystanders. With the panel 3 on the outside the more "active" side with the display screen 5 and the reduced keypad 4 is visible to any bystanders.

The various aspects of the device described above can be used alone or in various combinations.

The teaching of this application has numerous advantages. Different embodiments or implementations may yield one or more of the following advantages. It should be noted that this is not an exhaustive list and there may be other advantages which are not described herein. One advantage of the teaching of this invention is that it provides for a mobile electronic devices that can be clipped or clamped on to a piece of garment or cloth. It is another advantage of the teaching of this invention that it provides for mobile electronic device that can be worn on clothes or garment. It is another advantage of the teaching of this invention that it provides for a mobile device that it provides for easy, secure and comfortable clipping, transporting and wearing of the device. It is another advantage of the invention that it provided a mobile electronic device with a housing that forms a belt clip.

Although the teaching of this application has been described in detail for purpose of illustration, it is understood that such detail is solely for that purpose, and variations can be made therein by those skilled in the art without departing from the scope of the teaching of this application.

For example, although the teaching of this application has been described in terms of a mobile phone, it should be appreciated that the invention may also be applied to other types of electronic devices, such as cameras, video recorders, music players, palmtop computers and the like. It should also be noted that there are many alternative ways of implementing the methods and apparatuses of the teaching of this application. For example, although the swivel axis as been described as a simple pivot axis, it should be noted that other constructions that result in a similar swiveling capability can also be used.

The term "comprising" as used in the claims does not exclude other elements or steps. The term "a" or "an" as used in the claims does not exclude a plurality.

The invention claimed is:

1. A mobile electronic device comprising a housing with two panels arranged to swivel about a swivel axis so that the panels can swivel between a retracted position in which at least a major portion of the two panels overlap one another and an extended position in which only a minor portion of said panels overlap one another, said panels being shaped and dimensioned to define a space between them when the panels are in the retracted position, said space being suitable for receiving and clamping an item such as garment or clothing between the panels when the panels are in the retracted position, at least one of the two panels having a keypad and the other of the two panels having a display and a reduced keypad configured for use when the item is clamped between the panels,
   wherein said space between the panels is narrow near the extremity of the panels opposite to the swivel axis and widens in the direction towards said swivel axis.

2. A device according to claim 1, wherein at least one of the panels is provided with a protrusion near or at the narrow area of the space between the panels.

3. A device according to claim 1, wherein there is substantially no space between the panels in the area near the swivel axis.

4. A device according to claim 1, wherein said swivel axis is located near one of the extremities of the panels.

5. A device according to claim 4, wherein the extremities of the panels opposite to the swivel axis are shaped so that they form a substantially V-shaped recess that facilitates easy entry of a piece of cloth or other fabric material to enter the narrow space between the panels.

6. A device according to claim 4, wherein the extremities of the panels near the swivel axis are shaped so as to form a single substantially smooth convex surface when the panels are in the retracted position.

7. A device according to claim 6, wherein the panels are shaped and dimensioned to assume an S-shaped configuration with a substantially smooth contour in the extended position.

8. A device according to claim 1, wherein the keypad is provided ona surface of the at least one panel.

9. A device according to claim 8, wherein the reduced keypad is provided on one of the other surfaces of the other of the two panels.

10. A device according to claim 1, wherein the display is provided on one of the surfaces of the other of the two panels.

11. A device according to claim 1, wherein one of the services of the panels is provided with a mirror.

12. A device according to claim 1, comprising a music or media player and/or a mobile phone, and/or a digital still and/or motion camera and/or a navigation unit.

13. A device according to claim 1, wherein the housing of the device 1 forms itself a clip.

14. A mobile electronic device comprising a housing with two panels than can swivel relative to one another between a retracted position in which the panels substantially overlie one another and an extended position in which only a minor portion of said panels overlie one another, wherein said panels are shaped and dimensioned so as to form a clip when the panels are in the retracted position, at least one of the two panels having a keypad and the other of the two panels having a display and a reduced keypad configured for use when an item is clipped between the panels,
   wherein said clip defines a space between the panels that is narrow near an extremity of the panels opposite a swivel axis and that widens in the direction towards said swivel axis.

* * * * *